US000001197H

United States Statutory Invention Registration [19]

[11] Reg. Number: H1197

Mank et al.

[43] Published: Jun. 1, 1993

[54] SYSTEM FOR AND METHOD OF DECONTAMINATING TOXIC AGENTS FROM INTERIOR CONTAMINATED SURFACES OF COMBAT VEHICLES AND LIKE ENCLOSURES

[75] Inventors: James F. Mank, Dublin; Michael D. Milosh, Columbus, both of Ohio; Drew B. Farenwald, Joppatowne, Md.

[73] Assignee: The United States of America as represented by the Secretary of the Army, Washington, D.C.

[21] Appl. No.: 901,616

[22] Filed: Jun. 15, 1992

Related U.S. Application Data

[63] Continuation of Ser. No. 711,822, Jun. 7, 1991, abandoned.

[51] Int. Cl.[5] ..... F24J 3/00

[52] U.S. Cl. ..... 432/224; 432/72; 432/199; 432/225; 432/226

[58] Field of Search ..... 432/224, 225, 226, 209, 432/184, 72, 143, 152, 176, 199

[56] References Cited

U.S. PATENT DOCUMENTS

| | | | |
|---|---|---|---|
| 377,467 | 2/1888 | Root | 432/226 |
| 1,445,220 | 2/1923 | Lee | 432/224 |
| 3,706,446 | 12/1972 | Briggs | 432/224 |
| 3,809,531 | 5/1974 | Jones | 432/225 |
| 4,364,729 | 12/1982 | Fresch | 432/225 |
| 4,718,643 | 1/1988 | Gitman | 432/225 |

*Primary Examiner*—Stephen C. Bentley
*Attorney, Agent, or Firm*—Anthony T. Lane; Edward Goldberg; Michael Sachs

[57] ABSTRACT

Heat is used to decontaminate toxic agents from the interior contaminated surfaces of combat vehicles and like enclosures. The heat vaporizes the toxic agents, but does not cause heat damage to the interior contaminated surfaces themselves. Hoses are used to convey the heat to the toxic agent to vaporize the same, as well as to remove the vaporized toxic agent away from the interior contaminated surface for discharge outside the enclosure.

22 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SYSTEM FOR AND METHOD OF DECONTAMINATING TOXIC AGENTS FROM INTERIOR CONTAMINATED SURFACES OF COMBAT VEHICLES AND LIKE ENCLOSURES

GOVERNMENTAL INTEREST

The Government has rights in this invention pursuant to Contract No. DAAK11-81-C-0106 awarded by Department of the Army.

This application is a continuation of application Ser. No. 07/711,822, filed Jun. 7, 1991, now abandoned.

BACKGROUND OF THE INVENTION

1. Field of the Invention

This invention generally relates to a system for, and a method of, decontaminating toxic agents from interior contaminated surfaces of combat vehicles and like enclosures and, more particularly, to removing and detoxifying chemical and/or biological agents from the interior surfaces of such enclosures as crew compartments, shelters, command and control vans, aircraft interiors, watercraft interiors, tank interiors, as well as electrical equipment in such interiors, without damaging the interior surfaces themselves.

2. Description of Related Art

Combat vehicles and crews need a safe and effective means of decontaminating interior surfaces of such vehicles. During chemical and biological warfare, chemical as well as biological agents can enter the interiors of vehicles by wind infiltration through ventilation systems and on the clothes and equipment of entering personnel, supplies and ammunition. Open access hatches and doors during a "toxic rain" attack allow toxic agents to enter vehicle interiors. Studies have shown that, once contaminated, the interior surfaces of such vehicles are likely to remain toxic for a significant period of time, thereby forcing personnel to don masks and protective clothing ensembles for maximum protection against the toxic agent.

Standard chemical decontaminants are known, and are effective in detoxifying chemical agents used in combat. However, there is at present no suitable system for interior decontamination because the known standard chemical decontaminants attack and damage the materials typically used in such enclosures. Such materials include electrical insulation, structural and window plastics, optical materials, fabrics such as nylon and cotton, rubber materials and sheet steel.

SUMMARY OF THE INVENTION

1. Objects of the Invention

It is a general object of this invention to decontaminate toxic agents from interior contaminated surfaces of combat vehicles and like enclosures without causing damage to the surfaces themselves.

It is another object of this invention to utilize heat rather than chemical decontaminants to decontaminate interior surfaces of enclosures.

Another object of this invention is to safely, effectively and rapidly decontaminate interior contaminated surfaces of such enclosures.

2. Features of the Invention

In keeping with these objects, and others which will become apparent hereinafter, one feature of this invention resides, briefly stated, in a system for and a method of decontaminating toxic agents from interior contaminated surfaces of combat vehicles and like enclosures.

In accordance with this invention, a gas such as air is heated to a predetermined temperature range sufficient to vaporize a toxic agent on an interior contaminated surface inside an enclosure, but insufficient to cause heat damage to the interior contaminated surface itself. In the preferred embodiment, the predetermined temperature range is about 350° F. to about 400° F.

The heated gas is conveyed at a predetermined flow of velocity, e.g., about 800 ft. per minute to about 1200 ft. per minute, to a predetermined portion of the interior contaminated surface. The heated gas vaporizes the toxic agent on the interior surface after a predetermined time period, e.g., on the order of one minute. The vaporized toxic agent is then conveyed away from the predetermined portion of the interior surface for discharge outside the enclosure.

In the preferred embodiment, the gas is heated by mixing air with a heated combustion product formed in a combustion chamber. Diesel fuel and air are supplied to the chamber and are ignited therein by a spark plug. A flamesensor senses ignition within the combustion chamber and controls the flow of fuel to the chamber by opening and closing a fuel valve in dependence upon whether or not ignition has been sensed.

The delivery means includes a delivery hose having one end connected to a feed blower, and an opposite end terminating in a hand-held feed nozzle from which the heated gas flows. The removal means includes a discharge hose along which a carrier stream is conveyed. A discharge blower generates the carrier stream within the discharge hose. The discharge hose has a suction nozzle at one end thereof for sucking into the discharge hose the vaporized toxic agent which is entrained by the carrier stream. The discharge hose also has an opposite end located outside the enclosure.

In use, an operator holds the feed nozzle in one hand and the suction nozzle in the other hand. Both nozzles are directed at the portion of the interior surface to be decontaminated. User-operated system controls are advantageously provided on one of the nozzles. Indicator lights may also advantageously be located on one of the nozzles.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
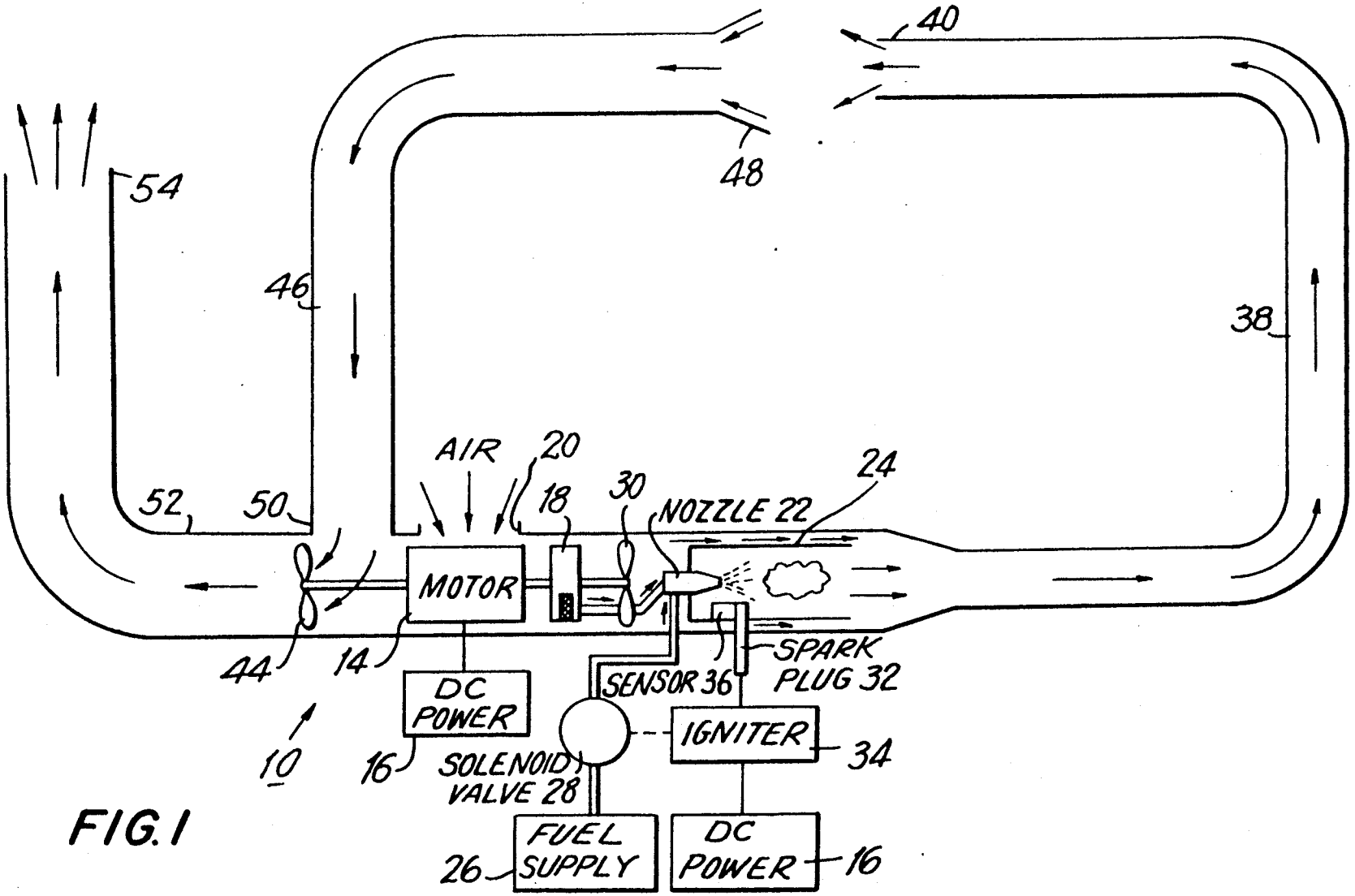
FIG. 1 is a diagrammatic view of a decontamination system according to this invention.
Figure 2:
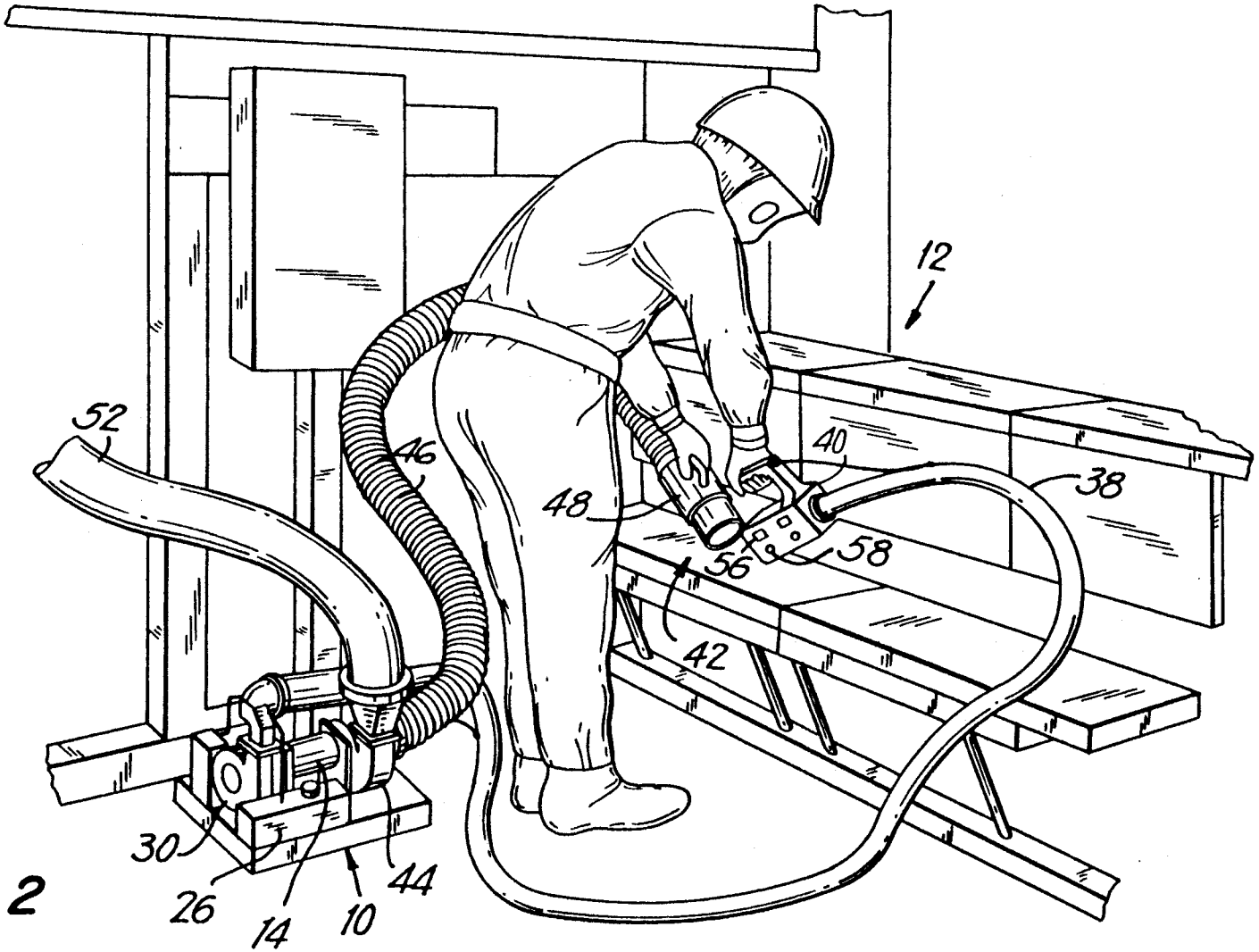
FIG. 2 is a perspective view of the system of FIG. 1 in use.

Referring now to the drawings, reference numeral 10 generally identifies a decontamination system that is brought into an enclosure 12 such as the interior compartment shown in FIG. 2. Alternatively, the decontamination system can be permanently installed within the enclosure.

The system 10 includes an electrical motor 14 powered by an on-board or separate power supply 16, typically a 24v DC supply. The motor 14 drives an air pump 18 which draws air into an inlet 20, and supplies compressed air at a pressure of about 2–5 psig to a fuel atomizing nozzle 22 mounted in a combustion chamber 24. The compressed air passing through the nozzle 22 creates a slight vacuum inside the chamber 24 and causes diesel fuel to flow from a fuel supply storage tank 26 through an electrically operated solenoid valve 28 to the nozzle 22. The nozzle 22 atomizes the fuel and, together with air contained in the chamber 24, forms a combustible mixture.

The motor 14 also drives a hot air rotary blower 30. Blower 30 draws air into the inlet 20 and supplies air for the combustion chamber 24. A spark plug 32 ignites the fuel and air mixture in the chamber 24 to form a heated combustion product. Ignition is controlled by a solid state spark igniter 34 connected to the power supply 16. The igniter 34 controls the duration and the timing of the spark at the plug 32, and also controls the opening and closing of the valve 28 by means of a flame sensor 36 in the combustion chamber 24. The flame sensor 36 senses the combustion flame in the chamber. If no flame is detected within a preset period of time, e.g., several seconds, then the sensor signals the igniter 34 to de-energize the valve 28 and interrupt the flow of fuel to the atomizing nozzle 22. If a flame is detected in the chamber, then the sensor 36 signals the igniter 34 to maintain the valve 28 open.

The hot air blower 30 conveys excess air past the chamber where such excess air is mixed with the heated combustion product to produce a heated air stream of approximately 450° F. This heated air stream is conveyed along a flexible elongated delivery hose 38 to a feed nozzle 40 where the heated air stream is forcibly emitted. As shown in FIG. 2, the feed nozzle 40 is directed at an interior contaminated surface 42, such as a bench seat, to be decontaminated.

The heated air stream issuing from the feed nozzle 40 must be hot enough to vaporize the toxic agent on the contaminated surface 42, but cool enough not to do damage to the surface 42 itself. The materials most frequently used in the interiors of combat vehicles are as follows:

(a) Heavy-duty nylon fabric sold under the trademark "Cordura" is used in seats and strapping.

(b) Lightweight nylon fabric sold under the trademark "Gortex", coated on one side, is used for seat covers and waterproof bags.

(c) Cotton fabric such as canvas used for litters, seat covers and protective sheets.

(d) Rubber material sold under the trademark "Neoprene" is used for protective covers and headrests.

(e) Acrylic plastic sheets are used for gauge faces and glasses.

(f) Painted sheet steel metal is used on equipment cabinets, walls and structural supports.

(g) Polycarbonate plastic block sold under the trademark "Lexan" is used for gauge faces, canopies and periscope blocks.

Tests have been conducted to determine how these frequently encountered materials react at temperatures on the order of 400° F. The following test results were indicated when the heated air stream flowed at a velocity of 800–1200 ft. per minute:

(a) The heavy-duty nylon fabric showed degradation in the form of melting and twisting at 450° F. for all exposure times. Slight twisting was observed after 3 minutes at 350° F. No effects were visible at 250° F.

(b) The lightweight nylon fabric showed considerable melting and burning at 450° F. After 3 minutes, the fabric was about 50% charred. A small amount of twisting was observed at 350° F. No damage occurred at 250° F.

(c) Light brown scorching appears on the canvas after 3 minutes at 450° F.

(d) The rubber material softened slightly at 450° F. after 3 minutes.

(e) The acrylic plastic sheet (0.06" thick) softened at all temperatures and bent at temperatures around 230° F. The acrylic plastic sheet (0.375" thick) showed no visible damage after 3 minutes at 450° F.

(f) The painted sheet steel showed no damage at 450° F. after 3 minutes.

(g) The polycarbonate block (0.375" thick) formed vision-obscuring bubbles after 2 minutes at 450° F.

On the basis of the material degradation tests, the maximum allowable output temperature for the heated air stream is approximately 400°–450° F. Output temperatures of 350° F. or lower are preferable for fabrics and plastics. Exposure time should be limited to 3 minutes or less, e.g., 1 minute.

System 10 also includes a discharge blower 44 driven by the same motor 14. The blower 44 conveys a carrier stream along a flexible elongated suction hose 46. A suction nozzle 48 is located at one end of the hose 46. The opposite end 50 of the hose 46 is connected to an inlet of the blower 44. A discharge hose 52 has one end connected to the outlet of the blower 44, and an opposite end 54 is positioned outside the enclosure. The carrier stream entrains the toxic agent vaporized by the heated air stream issuing from the feed nozzle 40 and conveys the entrained toxic agent along the hoses 46, 52 for discharge outside the enclosure.

System controls 56, e.g., an on/off switch for the motor 14 and the igniter 34, are preferably located on the feed nozzle 40. System indicators 58 are also preferably mounted on the feed nozzle 40 to advise an operator as to the status of the system.

In operation, an operator holds the feed nozzle 40 in one hand and the suction nozzle 48 in the opposite hand. Both nozzles are provided with handles to facilitate their being held by the operator and their positioning adjacent the interior contamined surface 42. Once the system controls 56 are actuated, the heated air is directed at the surface 42, thereby vaporizing the toxic agent thereof. The discharge blower 44 entrains the vaporized toxic agent in a carrier stream and sucks the entrained toxic agent in the suction nozzle 48. The feed hose 38 and the suction hose 46 are both constituted of a flexible material to enable the operator to readily position the nozzles wherever desired inside the enclosure 12. The discharge hose 52 is also constituted of a flexible material to ensure its ducting outside the enclosure. The operator checks the status indiator lights 58 to monitor the system operation.

It will be understood that each of the elements described above, or two or more together, also may find a useful application in other types of constructions differing from the types described above.

While this invention has been illustrated and described as embodied in a system for and method of decontaminating toxic agents from interior contaminated surfaces of combat vehicles and like enclosures, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A system for decontaminating toxic agents from interior contaminated surfaces of combat vehicles and like enclosures, comprising:

(a) means for heating a gas to a predetermined temperature range sufficient to vaporize a toxic agent on an interior contaminated surface inside an enclosure, but insufficient to cause heat damage to the interior contaminated surface itself;

(b) delivery means for conveying the heated gas at a predetermined flow velocity to a predetermined portion of the interior contaminated surface to vaporize the toxic agent thereon after a predetermined time period; and (c) removal means for conveying the vaporized toxic agent away from the predetermined portion of the interior contaminated surface for discharge outside the enclosure.

2. The system according to claim 1, wherein the heating means includes a combustion chamber, fuel supply means for supplying fuel to the combustion chamber, air supply means for supplying air to the combustion chamber, and ignition means for igniting the fuel and the air within the combustion chamber to form a heated combustion product which heats said gas.

3. The system according to claim 2, wherein the fuel supply means includes a control valve having open and closed states in which the fuel is blocked from reaching, and is permitted to reach, the combustion chamber, respectively; and wherein the ignition means controls the control valve to be in the closed state during ignition.

4. The system according to claim 3, wherein the ignition means includes flame sensor means for sensing ignition within the combustion chamber, and for controlling the control valve to be in the open state when ignition has not been sensed for a predetermined time interval.

5. The system according to claim 1, wherein the gas is air; wherein the predetermined temperature range is about 350° F. to about 400° F.; wherein the predetermined flow velocity is about 800 ft. per minute to about 1200 ft. per minute; wherein the predetermined time period is about one minute; and wherein the predetermined portion of the interior contaminated surface is on the order of four square inches.

6. The system according to claim 1, wherein the delivery means includes a feed blower having an output, and an elongated delivery hose having one end connected to the feed blower output, and an opposite end terminating in a nozzle from which the heated gas flows.

7. The system according to claim 1, wherein the removal means includes a discharge blower operative for generating a carrier stream, and an elongated discharge hose along which the carrier stream is conveyed, said discharge hose having one end in which the vaporized toxic agent flows by entrainment with the carrier stream, and an opposite end located outside the enclosure.

8. The system according to claim 1, wherein the delivery means includes a feed blower, wherein the removal means includes a discharge blower, and wherein both blowers are driven by a common electrical motor.

9. The system according to claim 1, wherein the delivery means includes a hand-held nozzle connected to a delivery hose for delivering the heated gas to the interior contaminated surface, and wherein the removal means includes a hand-held nozzle connected to a discharge hose for removing the vaporized toxic agent from the interior contaminated surface.

10. The system according to claim 9; and further comprising user-operated system controls on at least one of the nozzles.

11. The system according to claim 9; and further comprising indicator means on at least one of the nozzles.

12. A method of decontaminating toxic agents from interior contaminated surfaces of combat vehicles and like enclosures, comprising the steps of:

(a) heating a gas to a predetermined temperature range sufficient to vaporize a toxic agent on an interior contaminated surface inside an enclosure, but insufficient to cause heat damage to the interior contaminated surface itself;

(b) conveying the heated gas at a predetermined flow velocity to a predetermined portion of the interior contaminated surface to vaporize the toxic agent thereon after a predetermined time period; and (c) conveying the vaporized toxic agent away from the predetermined portion of the interior contaminated surface for discharge outside the enclosure.

13. The method according to claim 12, wherein the heating step is performed by igniting fuel and air in a combustion chamber to form a heated combustion product, and by mixing the heated combustion product with the gas.

14. The method according to claim 12, wherein the step of conveying the heated gas is performed by a delivery blower.

15. The method according to claim 12, wherein the heating step heats the gas to a predetermined temperature range of about 350° F. to about 400° F.; and wherein the step of conveying the heated gas conveys the heated gas at a predetermined flow velocity of about 800 ft. per minute to about 1200 ft. per minute for a predetermined time period of about one minute away from a predetermined portion of the interior contaminated surface of about four square inches.

16. The method according to claim 12, wherein the step of conveying the heated gas is performed by positioning an end of a delivery hose adjacent the predetermined portion of the interior contaminated surface, and wherein the step of conveying the vaporized toxic agent is performed by positioning an end of a discharge hose adjacent the same predetermined portion of the interior contaminated surface.

17. The method according to claim 16, wherein the positioning steps are performed by holding the ends of the delivery and discharge hoses in different hands.

18. The method according to claim 16; and further comprising the step of operating system controls at the end of one of the hoses.

19. The method according to claim 16; and further comprising the step of checking system indicators located at the end of one of the hoses.

20. The method according to claim 16, wherein the step of conveying the vaporized toxic agent includes the step of entraining the vaporized toxic agent in a flowing carrier stream that is ducted by the discharge hose outside the enclosure.

21. The method according to claim 12, wherein the step of conveying vaporized toxic agents is performed by a discharge blower with its intake located within the enclosure or vehicle, whether ducted through a hose and nozzle or not; whereas its discharge is directed out of the vehicle, whether ducted through a hose or not.

22. The system according to claim 1, wherein the heated gas temperature can be regulated by controlling, manually or automatically, fuel flow rate to the combustion chamber or feed air flow rate.

* * * * *